(12) United States Patent
Clark

(10) Patent No.: US 11,317,123 B2
(45) Date of Patent: Apr. 26, 2022

(54) SYSTEMS AND METHODS FOR USING PRE-CALCULATED BLOCK HASHES FOR IMAGE BLOCK MATCHING

(71) Applicant: VMWare, Inc., Palo Alto, CA (US)

(72) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1421 days.

(21) Appl. No.: 13/870,878

(22) Filed: Apr. 25, 2013

(65) Prior Publication Data

US 2014/0321553 A1 Oct. 30, 2014

(51) Int. Cl.
*H04N 19/90* (2014.01)

(52) U.S. Cl.
CPC ..................... *H04N 19/90* (2014.11)

(58) Field of Classification Search
None
See application file for complete search history.

(56) References Cited

U.S. PATENT DOCUMENTS

| | | | | |
|---|---|---|---|---|
| 7,672,005 | B1 * | 3/2010 | Hobbs | H04N 1/41 345/543 |
| 2004/0131115 | A1 * | 7/2004 | Burgess | H04N 7/147 375/240.01 |
| 2005/0262543 | A1 | 11/2005 | Wu | |
| 2009/0307430 | A1 * | 12/2009 | Bruening | G06F 12/0862 711/119 |
| 2010/0293248 | A1 * | 11/2010 | Kam | H04N 21/23109 709/219 |
| 2011/0093605 | A1 | 4/2011 | Choudhury | |
| 2011/0299785 | A1 | 12/2011 | Albu | |
| 2012/0286979 | A1 * | 11/2012 | Carlson | H03M 7/3086 341/51 |
| 2014/0297669 | A1 * | 10/2014 | Rajakarunanayake | G06F 17/3087 707/756 |
| 2014/0369413 | A1 | 12/2014 | Clark | |

OTHER PUBLICATIONS

Hong et al, "H.264 Hierarchical P Coding in the Context of Ultra-Low Delay, Low Complexity Applications," 28th Picture Coding Symposium, Nagoya, Japan, Dec. 8-10, 2010.*

(Continued)

*Primary Examiner* — Michael J Hess
(74) *Attorney, Agent, or Firm* — Fish & Richardson P.C.

(57) ABSTRACT

A server accesses a previous frame of an image in a video and obtains hash values for each pixel in the previous frame and creates a hash map that stores each of the hash values. The server receives a current frame of the image and separates the current frame into a plurality of current blocks of pixels. The server calculates, using a hash function, a hash value for each of the current blocks of pixels. The server compares the hash values in the hash map with the hash values associated with the current frame and identifies a hash value in the hash map that matches a hash value in the current frame. The server compresses the current frame for transmission to a client using the identified matching hash values and pre-calculates a new hash map based on the current frame for use in compressing a next frame of the video.

16 Claims, 2 Drawing Sheets

(56) References Cited

OTHER PUBLICATIONS

"Advanced Video Coding for Generic Audiovisual Services." International Telecommunication Union, H.264, Mar. 2005, 343 pages.
Turaga, Deepak, et al.; "Search Algorithms for Block-Matching in Motion Estimation"; Mid-Term Project 18-899; Spring 1998; pp. 1-14; available at httg://www.ece.cmu.edu/-ee899/groject/deegak_mid.htm.
'Java Platform 1.2' [online], "Class HashMap," 1998, [retrieved on Apr. 20, 2018], retrieved from: URL <http://pages.cs.wisc.edu/~hasti/cs368/JavaTutorial/jdk1.2/api/java/util/HashMap.html>, 9 pages.

* cited by examiner

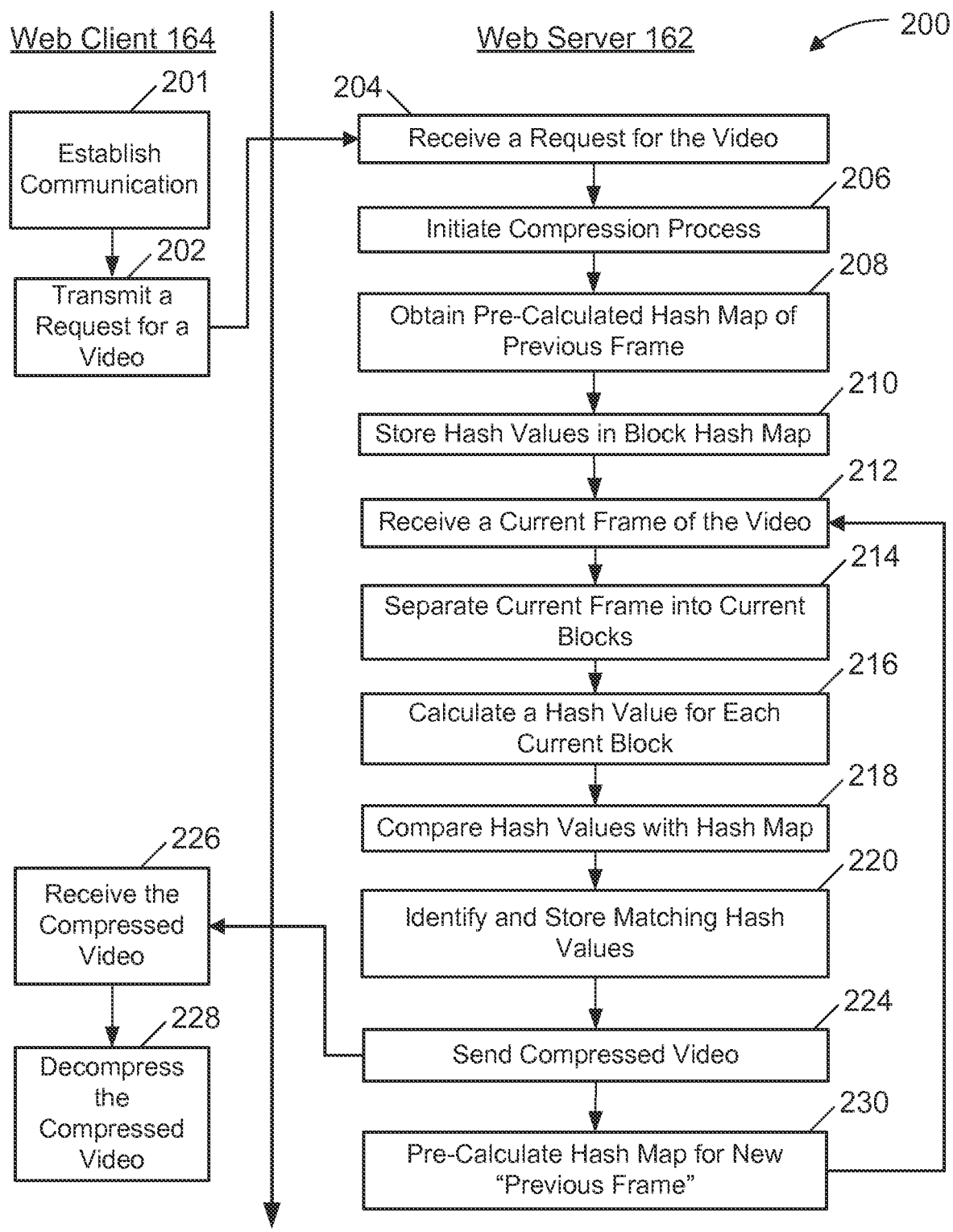

SYSTEMS AND METHODS FOR USING PRE-CALCULATED BLOCK HASHES FOR IMAGE BLOCK MATCHING

BACKGROUND

In the field of display remoting protocols, the time that lapses from the moment of a remote screen update to the appearance of the update at a local display is referred to as "latency." Reducing latency is important for providing a satisfactory user experience. However, since a graphical images, and especially moving images, i.e, "video," require a substantial amount of data, remoting of graphical display information requires a large amount network and processing bandwidth, which impacts latency. For example, the video needs to be compressed by the server, transmitted from the server to the client, and, thereafter, decompressed by the client. Each one of these steps contribute to an increase in the latency.

With respect to video data compression, block matching is a common approach adopted to reduce temporal redundancy in video sequences. The primary goal of a block matching algorithm is to find blocks of pixels in a current frame of video that matches blocks of pixels in past or future frames of video. This approach can be used to discover temporal redundancy in the video sequence and increase the effectiveness of interframe video compression. When an exact or partial match is found, the matching block of pixels can be transmitted using a motion vector that represents an offset in time and distance from a current block being analyzed.

Other known systems use a brute force approach to search for matching blocks of pixels. The brute force approach for block matching relies on comparing a reference block with all possible candidate blocks belonging to a corresponding search area by computing a "distance" between blocks, that is, the how different one block is from another in terms of pixel values. The most commonly used distance for this scope is the Sum of Absolute Differences (SAD), which is a well-known measure of block distance. Once the distances between the reference block and the candidate blocks have been computed, the best matching block is selected as the one corresponding to the minimum distance value found within the search area. However, using the brute force approach can be expensive to execute in real-time.

Most research to accelerate block search has focused on finding inexact matches using a threshold SAD and various gradient based descent search algorithms to limit pixel comparisons. Other algorithms may also be used to improve performance by limiting the search for pixel changes in a small region around a search point (e.g., an 8 pixel by 8 pixel region). However, reducing the search area in order to save computations does not guarantee finding, for each block, the candidate block at the globally minimum distance within the search area. As a result, a distortion of the compressed video signal tends to increase. In addition, using such a small region makes it challenging to find matches for fast moving content where blocks of pixels move more than 8 pixels between frames.

BRIEF DESCRIPTION

Systems and methods described herein compress video data by using image block matching that utilizes a full screen exact block search and pre-calculated block hashes in a latest frame of a video to reduce latency. A server for remoting a display to a remote client is provided, the server includes a processor that is configured to access a previous frame of an image in a video and to obtain hash values for each pixel in the previous frame. The processor is also configured to create a hash map that stores each of the hash values for each pixel in the previous frame. The processor is configured to receive a current frame of the image in the video and to separate the current frame into a plurality of current blocks of pixels. The processor is also configured to calculate, using a hash function, a hash value for each of the plurality of current blocks of pixels. The processor is further configured to compare the hash values in the hash map with the hash values associated with the current frame and to identify a hash value in the hash map that matches a hash value in the current frame. Moreover, the processor is configured to compress the current frame of the video for transmission to the remote client using the identified matching hash values and to pre-calculate a new hash map based on the current frame for use in compressing a next frame of the video.

BRIEF DESCRIPTION OF THE DRAWINGS

FIG. 2 is a swimlane diagram of an exemplary method for compressing a video using image block matching.

DETAILED DESCRIPTION

Figure 1:
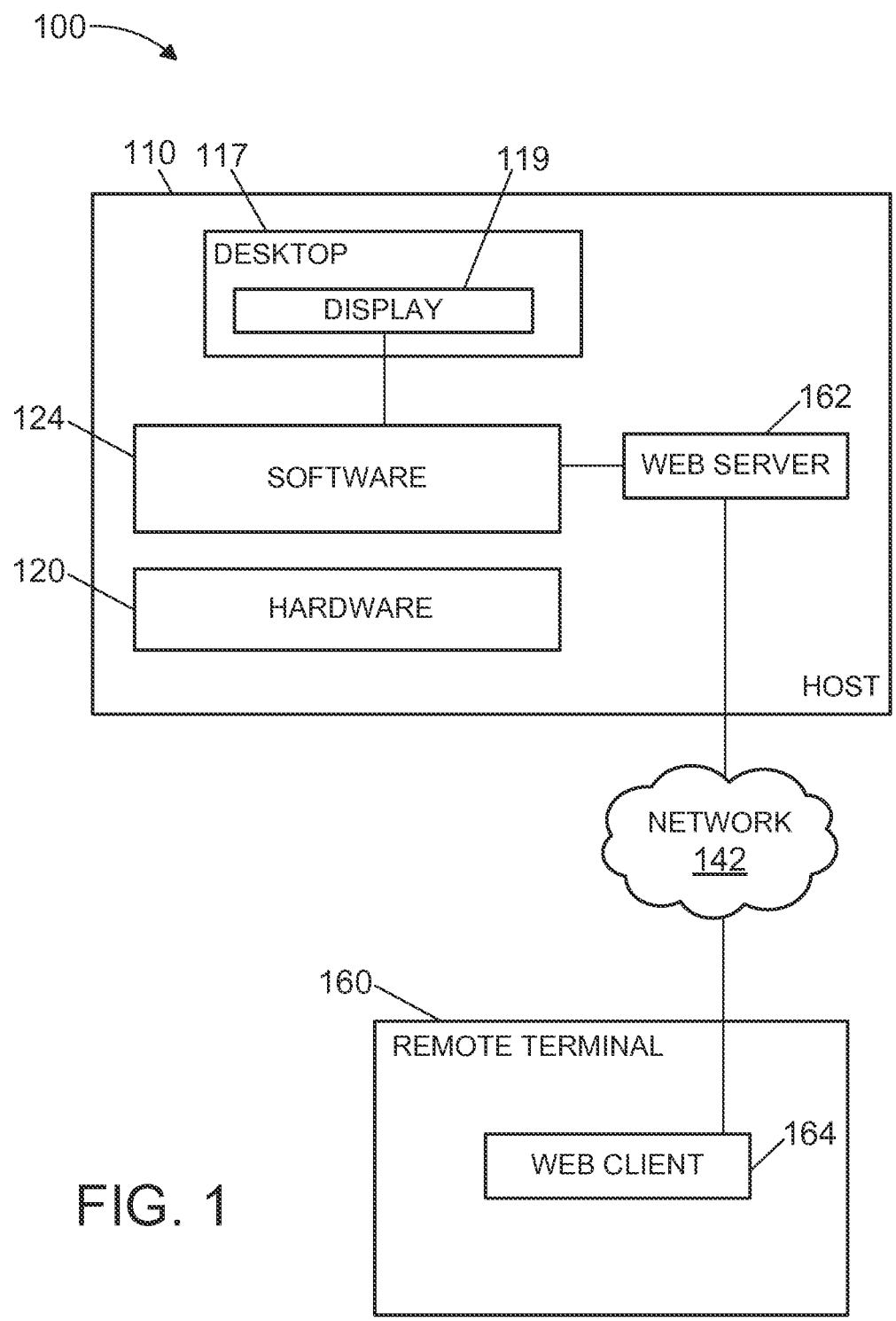
FIG. 1 is an exemplary system having a server in communication with a client.

FIG. 1 shows an exemplary system 100 that includes a physical computer system or host 110. Host 110 includes hardware 120 and software 124 running on hardware 120 such that various applications may be executing on hardware 120 by way of software 124. Software 124 may be implemented directly in hardware 120, e.g., as a system-on-a-chip, firmware, field-programmable gate array (FPGA), etc. Hardware 120 includes at least one processor (not shown), wherein each processor is an execution unit, or "core," on a microprocessor chip. Hardware 120 also includes a system memory (not shown), which is a general volatile random access memory (RAM), a network interface (NIC), and other devices.

In the exemplary embodiment, an end user may connect to, and interact with, host 110 using a remote terminal 160 that is capable of communicating with host 110 via a network 142, which may be the Internet, a LAN, a WAN, or any combination thereof. Remote terminal 160 may be a desktop computer, laptop, mobile device, thin client, or other similar device. Remote terminal 160 is capable of displaying applications running inside host 110 to the end user using a computer display (not shown) or similar device. Remote terminal 160 is also capable of receiving user input from the end user and transmitting the received user input to host 110.

Host 110 provides at least one desktop 117 (only one being shown in FIG. 1) to a user of host 110. (In a virtual desktop infrastructure (VDI) deployment, each desktop 117 may be exported from a corresponding one of a plurality of virtual machines to a plurality of users in disparate remote locations.) Desktop 117 is an interactive user environment provided by an operating system and/or applications running within host 110, and generally includes one or more screens or displays 119 (only one being shown in FIG. 1), but may include other outputs, such as audio, indicator lamps, tactile feedback, etc. Desktop 117 also accepts input from the user in the form of device inputs, such as keyboard and mouse inputs. Desktop 117 may also accept simulated inputs, such as simulated keyboard and mouse inputs. In addition to user input/output, desktop 117 may send and receive device data, such as input/output for a FLASH memory device local to the user, or to a local printer. In the exemplary embodiment, display 119 may be presented to an end user on the computer display of remote terminal 160.

In the exemplary embodiment, host 110 also includes a server, such as web server 162, that is in communication with software 124. Web server 162 is also in communication with remote terminal 160 and a client, such as web client 164, via network 142. In some implementations, web server 162 may also be implemented on a stand-alone server (not shown). Web client 164, in the exemplary embodiment, is a web browser that is configured to run on remote terminal 160 and connects to web server 162 as necessary. It should be recognized that while specifically a web server 162 and web client 164 is shown and described herein, any sort of server capable of sending screen update data to any sort of client capable of receiving the screen update data and generating and displaying graphical data generated at desktop 117 can be used.

System 100 may be implemented on a physical desktop computer system, such as a work or home computer that is remotely accessed when travelling. Alternatively, system 100 may be implemented on a VDI that has a plurality of virtual machines (VMs) (not shown) on host 110. In the latter case, software 124 may be virtualization software and one or more VMs (not shown) may be executing on hardware 120 by way of the virtualization software. It should therefore be understood that the present invention can be implemented in a variety of contexts, but may be particularly useful wherever graphical user interface display remoting is implemented.

During operation of system 100, as explained in more detail below with respect to FIG. 2, a video is compressed prior to the transmission of the video from web server 162 to web client 164. More specifically, web server 162 compresses the video using image block matching that utilizes a full screen exact block search. In general, upon receiving a web request that corresponds to a request for a video from web client 164, web server 162 receives the video or other screen updates from desktop 117. Web server 162 may then compare the new screen update data with previous frame information to identify redundant, though moved, pixel blocks, e.g., as might be the case when text in a window is scrolled or a window is dragged from one position to another on the desktop. The exact block search is performed by hashing the contents (i.e., pixel values) of each candidate block of the current frame and comparing it with hashes generated from the contents of pixel blocks of the previous frame. The hash values may be calculated as a rolling checksum.

One of the most time consuming aspects of performing a full screen exact block matching by matching hash values between blocks of pixels on a current frame of a video and blocks of pixels in a previous frame of the video is the calculation of block hashes for the previous (i.e., reference) frame of the video. For example, compared with a calculation of block hashes for a current frame of the video and searching for matches between two hash sets, the block hash calculation for calculating block hashes for a previous frame takes approximately five to ten times longer. As described in further detail below, to reduce the overall time of executing a block search algorithm, calculating block hashes for a previous frame is shifted to a non-critical time period (e.g., after a current frame is delivered to a client) in the process. For example, because the last frame of a video is available prior to a next frame being presented, a map that stores the block hash values for every pixel in the previous frame is created and these pre-calculated block hash values are stored in the block hash map. Thus, when then next/current frame becomes available, a search can be performed between the block hashes for the current frame and the block hash map.

Using this approach, image block matches can be robustly found for desktop based content orders of magnitude faster than current systems and methods. To illustrate this further, a full-screen exhaustive block search for a standard 1280× 1024 display is capable of being performed in less than 1 millisecond of central processing unit time. In contrast, H264/MPEG-4 Part 10 or Advanced Video Coding (best known as being one of the codec standards for Blu-Ray™) takes 15-25 times more time and produces worse results than the full-screen exhaustive block search.

In the embodiments described herein, a block of pixels has dimensions that are a power of two (e.g., 2, 4, 8, 16, 32) for each dimension. In the following example, a block of pixels has a dimension of 16 pixels by 16 pixels and each block of pixels is associated with a particular pixel offset. Therefore, to determine which pixels (besides a particular pixel offset) are also included in a particular block of pixels, a block of pixels may be defined as including pixels to the right and below the pixel offset. For example, a hash for pixel offset x=4, y=5 is calculated using pixel values of a 16 pixel by 16 pixel block to the right and below the pixel offset, as shown in Table 1 below:

TABLE 1

(4, 5), (5, 5), (6, 5), . . . (19, 5)
(4, 6), . . . (19, 6)
.
.
.
(4, 5 + 15), . . . (19, 20)

In one embodiment, the number of hashes needed to be calculated for a current frame and compared are significantly reduced. For example, the total number of hashes to be calculated for current a frame using block offsets can be determined by dividing the number of pixels in a frame by the number of pixels in a block. Thus, if a frame is 1280 pixels by 1024 pixels and each block is 16 pixels by 16 pixels, the frame size of 1280 pixels by 1024 pixels is divided by the block size of 16 pixels by 16 pixels, which equals 5120. Therefore, only 5120 current-frame hashes need to be calculated and compared with a full hash map of the previous frame. The cost savings of only comparing 5120 hash values is significant when compared to current full screen search algorithms that can make up to 1.7 quadrillion pixel comparison operations. The calculation of the full hash map of the current frame can be performed concurrently with the comparison with the full hash map of the previous and completed before the next frame is available, at which time the new full hash map becomes the previous frame hash map. In another embodiment, the full hash map is pre-calculated entirely after the current frame is compressed but before the next frame is ready.

However, to improve cost savings even further, rather than calculating hash values for each pixel (e.g., each pixel offset) in a reference frame and each pixel in a current frame prior to comparing the hash values in the reference frame with the hash values in the current frame, the pre-calculated hash values for each pixel on a screen (e.g., the previous frame of video) can be stored in a block hash map. Therefore, to compare hash values in a reference frame/previous frame with hash values of a current frame, the hash values of the current frame are simply compared against the hash values in block hash map to identify any matches. In addition, this process enables a throttling of central processing unit (CPU) consumption allocated to CPU search. Thus, if an encoding portion of the process begins to consume large amounts of a CPU, system 100 may suffer and therefore throttling of the CPU is enabled, which results in low impact on overall system performance.

FIG. 2 shows an exemplary method 200 for compressing a video requested by web client 164. More specifically, the video is compressed by a server (e.g., web server 162) located within host 110 (shown in FIG. 1) using image block matching that utilizes a full screen exact block search and the compressed video is transmitted to a client (e.g., web client 164) located within remote terminal 160 (shown in FIG. 1). This method may be embodied within a plurality of computer-executable instructions stored in one or more memories, such as one or more computer-readable storage mediums. Computer storage mediums may include non-transitory and include volatile and nonvolatile, removable and non-removable mediums implemented in any method or technology for storage of information such as computer-readable instructions, data structures, program modules or other data. The instructions may be executed by one or more processors to perform the functions described herein.

In operation 201, web client 164 establishes one or more communication channels with web server 162, wherein the channel(s) facilitate communication between web client 164 and web server 162 such that data may be transmitted from web server 162 to web client 164. For example, in operation 202, web client 164 transmits a request to web server 162, wherein the request corresponds to a request for a video. In operation 204, the request for the video is received by web server 162. However, prior to sending the video to web client 164, the video is compressed by web server 162 using image block matching that utilizes a full screen exact block search. More specifically, in operation 206, web server 162 initiates a compression process by accessing a previous frame of an image of the video and sending to web client 164 and pre-calculating a full hash map of the previous frame. The full hash map will include a hash value for each pixel block at each pixel offset corresponding to a full pixel block. In operation 208, web server 162 obtains the pre-calculated hash values for pixel blocks at every pixel offset in the previous frame and stores them in a block hash map in operation 210. For example, because the last frame of a video (e.g., the previous frame) is available prior to a next/current frame being presented, a map that stores the block hash values for every pixel in the previous frame is created and these pre-calculated block hash values are stored in the block hash map. Thus, when then next/current frame becomes available, a search can be performed immediately between the block hashes for the current frame and the block hash map.

In operation 212, the current frame of the video is received by web server 162. The current frame is then separated into a plurality of current blocks of pixels in operation 214. The dimensions of a block of pixels is a power of two (e.g., 2, 4, 8, 16, 32) for each dimension. In one embodiment, a 16 pixel by 16 pixel block is associated with a particular pixel offset. The block of pixels may be defined as including pixels to the right and below the pixel offset (as shown in Table 1). For a 1280×1024 pixel current frame, the frame is divided into 5,120 16×16 pixel blocks that makes up the frame. In operation 216, a hash value for each of the plurality of the current blocks of pixels is calculated by web server 162. For example, a value of each pixel within the current block of pixels may be used in the hash function to calculate a hash value for a corresponding pixel offset. These hash values can be stored in a hash lookup table in the system memory (not shown). Thus, because each pixel offset corresponds to a particular hash value, the hash lookup table only includes a single memory reference (e.g., hash value) per pixel block. In operation 218, web server 162 compares the hash values in the hash map for the previous frame with the hash values in the hash table associated with the current frame. In operation 220, web server 162 identifies and stores information indicating which hash values in the hash map match hash values in the current frame.

After all matches have been identified and the video is compressed, the compressed video is sent to web client 164 in operation 224. Web client 164 receives the compressed video in operation 226 and then decompresses the video in operation 228. To decompress the video, web client 164 may use, for example, the same algorithm (e.g., codec) described above with respect to compressing the video using image block matching that utilizes a full screen exact block search. Thus, web client 164 is enabled to decompress the video using the codec embedded in the video data.

In operation 230, a hash map for the new previous frame (the frame just sent to web client 164) is pre-calculated in preparation for the next frame comparison. As previously mentioned, this operation may be performed concurrently with prior operations of flow chart 200. For example, in a host having parallel processing capabilities, the hash map may incorporate values calculated in operation 216 and remaining hash values may be calculated during comparison and compression operations 218, 220, 224.

Pre-calculation of the hash map for the previous frame enables the hash map to be ready to compare hash values with the next current frame when the process returns to operation 212 and the new "current frame" is available. Even if the hash map is not coherent or does not reflect the true state of the latest frame due to, for example, a failure to totally update the hash map due to CPU throttling, etc., the hash values stored in the hash map may still be compared with the hash values in the next current frame. Thus, while some block matches may not be found during this comparison, compression may still be achieved at degraded levels. Utilizing this knowledge, in one embodiment, updating the hash map with the hash values in a latest frame can actually occur concurrently with comparing the hash values in the hash map with the hash values in a current frame. As such, the functionality of updating a hash map can be ran in a separate set of threads. Further, if the separate threads are set to low-priority with the operating system, a throttling of the CPU consumption can be achieved. If the application or other parts of the system need the CPU, hash map update threads can yield their processor time, which results in low impact on overall system performance.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A server for remoting a display to a remote client, the server comprising a processor configured to:

pre-calculate a first hash map for a previous frame of a video that represents a graphical user interface of a desktop prior to a current frame of the video becoming available, wherein the current frame becomes available based on an update to the graphical user interface of the desktop, the first hash map comprising pre-calculated hash values stored for each of a plurality of pixel blocks at each of a plurality of pixel offsets in the previous frame, each pixel block including a plurality of pixels relative to the corresponding pixel offset, and wherein the previous frame depicts a view of the graphical user interface;

receive a current frame of the video, wherein the current frame is a sequentially next frame in the video from the previous frame and depicts an updated view of the graphical user interface that is updated from the previous frame based on the update to the graphical user interface;

separate the current frame into a plurality of current blocks of pixels at each of the plurality of pixel offsets of the current frame;

calculate, using a hash function, a hash value for each of the plurality of current blocks of pixels;

compare the previous frame to current frame of the video including comparing the pre-calculated hash values in the first hash map for the previous frame with the calculated hash values for the current blocks of pixels at each corresponding pixel offset of the current frame;

identify a hash value in the first hash map at a particular pixel offset that matches a hash value in the current frame at a corresponding pixel offset;

compress the current frame of the video for transmission to the remote client using the identified matching hash values;

pre-calculate a second hash map for the current frame of the video prior to a next current frame of the video that depicts a next updated view of the graphical user interface becoming available based on another update to the graphical user interface, the second hash map comprising the calculated hash values for each of the plurality of current blocks of pixels; and replacing the first hash map with the second hash map such that hash values calculated for the next current frame are compared to the hash values calculated for the current blocks of pixels of the current frame and such that hash values calculated for the next current frame are not compared to hash values of previous frames of the video when comparing the next current frame to the current frame and compressing the next current frame based on the comparing, the replacing the first hash map with the second hash map including replacing the pre-calculated hash values of the first hash map at each pixel offset with the hash values for each block of pixels in the current frame concurrently with comparing the pre-calculated hash value at that pixel offset with the calculated hash values such that the pre-calculated hash values are replaced for each pixel offset after each respective comparison.

2. The server of claim 1, wherein the current block of pixels has dimensions that are a power of two for each dimension.

3. The server of claim 1, wherein each of the current blocks of pixels is associated with a particular pixel in the current frame.

4. The server of claim 1, wherein the current frame is redefined as a reference frame, and wherein said processor is further configured to:
  receive the next current frame of the video;
  separate the next current frame into a plurality of next current blocks of pixels;
  calculate, using the hash function, a hash value for each of the plurality of current blocks of pixels in the next current frame;
  compare the hash values in the second hash map with the hash values associated with the next current frame without comparing the hash values associated with the next current frame with any of the pre-calculated hash values for the previous frame;
  identify a hash value in the second hash map that matches a hash value in the next current frame; and
  store information indicating that the hash value in the second hash map matches the hash value in the next current frame.

5. The server of claim 1, wherein the current block of pixels has dimensions that are a power of two for each dimension.

6. A method for image block matching, the method comprising:
  accessing a previous frame of an image in a video that represents a graphical user interface of a desktop, wherein the previous frame depicts a view of the graphical user interface;
  pre-calculating hash values for each of a plurality of pixel blocks at each of a plurality of pixel offsets in the previous frame prior to a current frame of the video becoming available, wherein the current frame becomes available based on an update to the graphical user interface of the desktop, wherein each pixel block includes a plurality of pixels relative to the corresponding pixel offset;
  creating a first hash map for the previous frame of the video prior to the current frame of the video becoming available based on the update to the graphical user interface of the desktop, the first hash map storing each hash value for each pixel offset in the previous frame;
  receiving the current frame of the image in the video, wherein the current frame is a sequentially next frame in the video from the previous frame and depicts an updated view of the graphical user interface that is updated from the previous frame based on the update to the graphical user interface;
  separating the current frame into a plurality of current blocks of pixels at each of the plurality of pixel offsets of the current frame;
  calculating, using a hash function, a hash value for each of the plurality of current blocks of pixels;
  comparing the previous frame to current frame of the video including comparing the pre-calculated hash values in the first hash map for the previous frame with the calculated hash values for the current blocks of pixels at each corresponding pixel offset of the current frame;
  identifying a hash value in the first hash map that matches a hash value in the current frame at a corresponding pixel offset;
  compressing the current frame of the video for transmission to a client using the identified matching hash values;
  pre-calculating a second hash map for the current frame of the video prior to a next current frame of the video that depicts a next updated view of the graphical user interface becoming available based on another update to the graphical user interface, the second hash map storing each hash value for each of the current blocks of pixels; and
  replacing the first hash map with the second hash map such that hash values calculated for a next current frame are compared to the hash values calculated for the current blocks of pixels of the current frame and such that hash values calculated for the next current frame are not compared to hash values of previous frames of the video when comparing the next current frame to the current frame and compressing the next current frame based on the comparing, the replacing the first hash map with the second hash map including replacing the pre-calculated hash values of the first hash map at each pixel offset with the hash values for each block of pixels in the current frame concurrently with comparing the hash value for the previous frame at that pixel offset with the hash values in the current frame, such that the hash values in the first hash map are replaced for each pixel offset after each respective comparison.

7. The method of claim 6, wherein the current block of pixels has dimensions that are a power of two for each dimension.

8. The method of claim 6, wherein each of the current blocks of pixels is associated with a particular pixel in the current frame.

9. The method of claim 6, wherein the current frame is redefined as a reference frame, and wherein the method further comprises:
  receiving the next current frame in the video;
  separating the next current frame into a plurality of next current blocks of pixels;
  calculating, using the hash function, a hash value for each of the plurality of next current blocks of pixels in the next current frame;
  comparing the hash values in the second hash map with the hash values associated with the next current frame without comparing the hash values associated with the next current frame with any of the pre-calculated hash values for the previous frame;
  identifying a hash value in the second hash map that matches a hash value in the next current frame; and
  storing information indicating that the hash value in the second hash map matches the hash value in the next current frame.

10. The method of claim 6, wherein dimensions of a block of pixels are a power of two for each dimension.

11. At least one non-transitory computer-readable storage medium having computer-executable instructions embodied thereon, wherein, when executed by at least one processor, the computer-executable instructions cause the at least one processor to:
  access a previous frame of an image in a video that represents a graphical user interface of a desktop, wherein the previous frame depicts a view of the graphical user interface;

pre-calculating hash values for each of a plurality of pixel blocks at each of a plurality of pixel offsets in the previous frame prior to a current frame of the video becoming available, wherein the current frame becomes available based on an update to the graphical user interface of the desktop, wherein each pixel block includes a plurality of pixels relative to the corresponding pixel offset;

create a first hash map for the previous frame of the video prior to the current frame of the video becoming available based on the update to the graphical user interface of the desktop, the first has map storing each of the hash values for each pixel offset in the previous frame;

receive the current frame of the image in the video, wherein the current frame is a sequentially next frame in the video from the previous frame and depicts an updated view of the graphical user interface that is updated from the previous frame based on the update to the graphical user interface of the desktop;

separate the current frame into a plurality of current blocks of pixels at each of the plurality of pixel offsets of the current frame;

calculate, using a hash function, a hash value for each of the plurality of current blocks of pixels;

compare the previous frame to current frame of the video including comparing the pre-calculated hash values in the first hash map for the previous frame with the calculated hash values for the current block of pixels at each corresponding pixel offset of the current frame;

identify a hash value in the first hash map at a particular pixel offset that matches a hash value in the current frame at a corresponding pixel offset; and compress the current frame of the video for transmission to a client using the identified matching hash values;

pre-calculate a second hash map for the current frame of the video prior to a next current frame of the video that depicts a next updated view of the graphical user interface becoming available based on another update to the graphical user interface, the second hash map storing each hash value for each of the current blocks of pixels; and replace the first hash map with the second hash map such that hash values calculated for the next current frame are compared to the hash values calculated for the current blocks of pixels of the current frame and such that hash values calculated for the next current frame are not compared to hash values of previous frames of the video when comparing the next current frame to the current frame and compressing the next current frame based on the comparing, the replacing the first hash map with the second hash map including replacing the pre-calculated hash values of the first hash map at each pixel offset with the hash values for each block of pixels in the current frame concurrently with comparing the hash value for the previous frame at that pixel offset with the hash values in the current frame, such that the hash values in the first hash map are replaced for each pixel offset after each respective comparison.

12. The at least one computer-readable storage medium of claim 11, wherein the hash map is a two-dimensional hash map.

13. The at least one computer-readable storage medium of claim 11, wherein each of the current blocks of pixels is associated with a particular pixel in the current frame.

14. The at least one computer-readable storage medium of claim 11, wherein the current frame is redefined as a reference frame, and wherein the computer executable instructions further cause the at least one processor to:
receive the next current frame of the video;
separate the next current frame into a plurality of current blocks of pixels;
calculate, using the hash function, a hash value for each of the plurality of current blocks of pixels in the next current frame;
compare the hash values in the second hash map with the hash values associated with the next current frame without comparing the hash values associated with the next current frame with any of the pre-calculated hash values for the previous frame;
identify a hash value in the second hash map that matches a hash value in the next current frame; and
store information indicating that the hash value in the second hash map matches the hash value in the next current frame.

15. The method of claim 1, wherein replacing the pre-calculated hash values of the first hash map at each pixel offset with the hash values for each block of pixels in the current frame concurrently with comparing the pre-calculated hash value at that pixel offset with the calculated hash values such that the pre-calculated hash values are replaced for each pixel offset after each respective comparison comprises replacing the pre-calculated hash values in a first set of threads that is different from a second set of threads that compare the pre-calculated hash value at that pixel offset with the calculated hash values.

16. The method of claim 15, wherein the first set of threads has a lower priority than the second set of threads, the method further comprising throttling an amount of central processing unit consumption allocated to the first set of threads based on other demands placed on the central processing unit.

* * * * *